United States Patent
Benner, Jr.

(10) Patent No.: US 7,940,380 B1
(45) Date of Patent: May 10, 2011

(54) ROTARY POSITION DETECTOR AND ASSOCIATED METHODS

(76) Inventor: William R. Benner, Jr., Longwood, FL (US)

( * ) Notice: Subject to any disclaimer, the term of this patent is extended or adjusted under 35 U.S.C. 154(b) by 231 days.

(21) Appl. No.: 12/115,642

(22) Filed: May 6, 2008

Related U.S. Application Data

(63) Continuation-in-part of application No. 12/017,193, filed on Jan. 21, 2008, now Pat. No. 7,688,432.

(60) Provisional application No. 60/886,168, filed on Jan. 23, 2007.

(51) Int. Cl.
*G01B 11/26* (2006.01)
(52) U.S. Cl. ............................ 356/138
(58) Field of Classification Search .......... 356/138, 356/622; 250/221
See application file for complete search history.

(56) References Cited

U.S. PATENT DOCUMENTS

| | | | |
|---|---|---|---|
| 3,411,852 A * | 11/1968 | Marinozzi, Jr. | 356/447 |
| 3,780,293 A * | 12/1973 | Flint | 250/339.03 |
| 3,983,391 A | 9/1976 | Clemons | |
| RE31,062 E | 10/1982 | Burke, Jr. | |
| 4,864,295 A | 9/1989 | Rohr | |
| 5,225,770 A | 7/1993 | Montagu | |
| 5,671,043 A | 9/1997 | Ivers | |
| 5,844,673 A | 12/1998 | Ivers | |
| 6,031,613 A * | 2/2000 | Washington | 356/364 |
| 6,218,803 B1 | 4/2001 | Montagu et al. | |
| 6,921,893 B1 | 7/2005 | Petschik et al. | |
| 7,034,282 B2 | 4/2006 | Oka et al. | |
| 2008/0013106 A1 | 1/2008 | Sidor et al. | |

* cited by examiner

*Primary Examiner* — Tarifur R. Chowdhury
*Assistant Examiner* — Isiaka O Akanbi
(74) *Attorney, Agent, or Firm* — Allen, Dyer, Doppelt, Milbrath & Gilchrist, P.A.

(57) ABSTRACT

A rotary position detector includes a housing having an inner space having a reflective element therewithin. A light source emits light rays upwardly. A base supports a light detector assembly having a first number of toroidal-sector-shaped light sensors disposed in pairs about a motor shaft axis, one "A" detector element and one "B" detector element alternately disposed. A light blocker rotates with the shaft above the light detector assembly and the light source and includes a second number of opaque, equal-surface-area elements arrayed about the axis, the second number equal to one-half the first number. A circuit measures a signal from the "A" and "B" detectors relating to an amount of light falling thereon, a difference related to an angular position of the motor shaft.

27 Claims, 5 Drawing Sheets

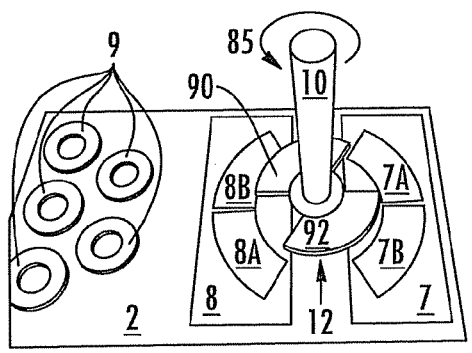
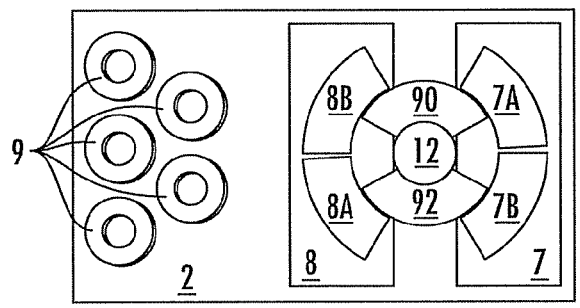
FIG. 3  FIG. 4
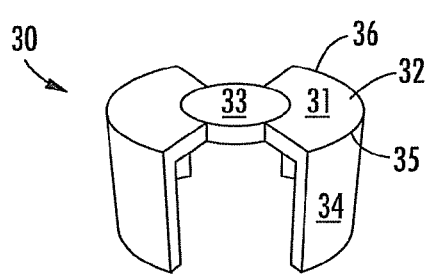
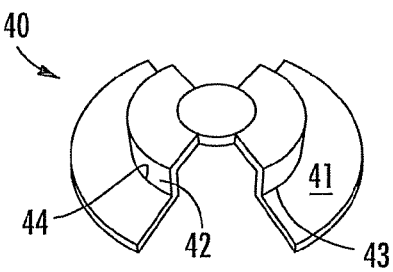
FIG. 5A  FIG. 5C
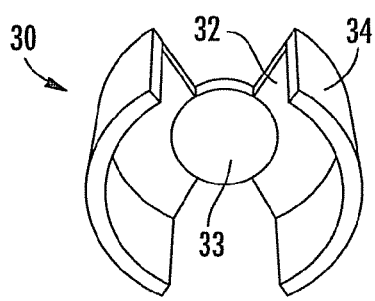
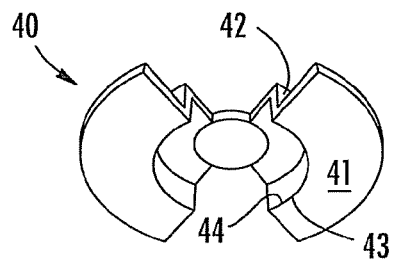
FIG. 5B  FIG. 5D
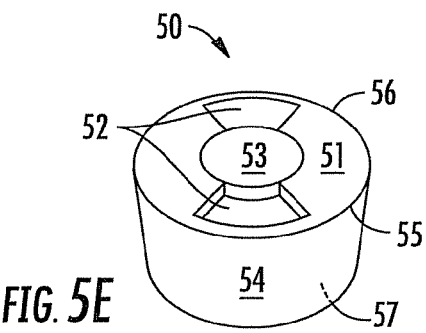
FIG. 5E

ROTARY POSITION DETECTOR AND ASSOCIATED METHODS

CROSS-REFERENCE TO RELATED APPLICATION

This application is a continuation-in-part of application Ser. No. 12/017,193, filed Jan. 21, 2008, now U.S. Pat. No. 7,688,432 which itself claimed priority to provisional application Ser. No. 60/886,168, filed Jan. 23, 2007. The contents of these applications are incorporated hereinto by reference.

FIELD OF THE INVENTION

This invention relates to rotary position detectors for indicating the angular position of a shaft or other rotating element. More particularly, this invention relates to such position detectors used on motors and galvanometer-based optical scanners.

DESCRIPTION OF RELATED ART

Rotary position detectors have many uses, such as detecting the position of the shaft on a motor, for the purpose of electrical commutation. Another such use is to detect the position of a tensioner pulley in a magnetic tape player or web-type printing press, for the purpose of maintaining a constant tension on the tape or paper. One of the more recent uses of a rotary position detector is to sense the position of the accelerator (gas) pedal in an automobile that uses electric motors as a partial or complete means of driving the wheels.

Galvanometer-based optical scanners are used to direct non-moving input light beams to a target area. This type of scanner uses a limited-rotation motor to impart rotational motion onto an optical element, such as a mirror. Normally the mirror is mounted directly on the output shaft of the motor. A position detector is included within the motor, either close to the output shaft, or on the "rear" portion of the motor. This position detector normally outputs a current or voltage signal that is proportional to the relative angle of the motor shaft, and thus, relative to the angle of the mirror with respect to the non-moving input light beam.

Galvanometer-based optical scanners direct a laser beam for marking, cutting, or display purposes, for which positioning accuracy and repeatability can be of critical importance. Therefore, one of the limiting factors of accuracy and repeatability is the performance of the position detector used with the optical scanner.

Ideally, a rotary position detector should only be sensitive to the rotational angle of the scanner shaft. Since a mirror is connected directly to the scanner shaft, it is the rotation angle of the shaft that dictates the direction of the exiting light beam. Axial motion and radial motion generally will not affect the target position of the light beam being reflected by the mirror, and since it is the target light beam position that is important to the scanning system, the output of the position detector should indicate the target position, and be insensitive to things that do not affect that target position, such as axial and radial motion. Axial shaft motion may occur as a dynamic behavior of the scanner. For example, if the magnetic construction of the scanner is not perfect, the shaft may surge outward or inward when strong current pulses are put into the scanner during strong acceleration and deceleration. Radial motion of the scanner can occur as a result of bearing "rumble" or imperfections in manufacturing, which allow a small amount of radial motion of the shaft. Radial shaft motion can also occur as a dynamic effect, if the rotor is not perfectly concentric with the stator components, or if the inertial load (mirror and mount) attached to the output shaft is not perfectly balanced.

A servo controller is connected between the position detector and the motor. If the position detector produces some output as a result of axial or radial shaft motion, the servo controller will mistakenly interpret this errant output as a change in rotational position, resulting in a positioning error of the overall system. For that reason, a perfect rotary position detector will produce an output only as the result of rotational motion, and will not produce an output as the result of axial or radial motion.

An additional desirable property of a rotary position detector, especially for galvanometer scanners used with analog servo systems, includes the feature that the output voltage or current be linear with respect to the rotation angle. That is to say, an incremental change in shaft rotation should produce an equally incremental change in output signal from the position detector. Further, the signal-to-noise ratio should be as high as possible.

There are several ways to sense the position of the shaft within an optical scanner. Two popular types of position detectors comprise capacitive position detectors and optical position detectors.

Capacitive position detectors were used in some of the very earliest galvanometer-based optical scanners. In one known detector, a rotating dielectric butterfly is connected to the scanner shaft, and the detection plates are fixed.

Optical position detectors have emerged recently as the position detector of choice in the field of galvanometer-based optical scanning. Typically, optical position detectors can be made small, and have low inertia, and can be manufactured at low cost. These properties make optical position detectors desirable for optical scanners applied in commercial and consumer markets.

One type of optical position detectors is a "shadow cast" position detector, wherein a large area of light sensor material is attempted to be evenly illuminated, and a shadow is cast on the light sensors by a light blocker. Optical position detectors can use photocells as the light sensors. These photocells are most commonly bulk-area PIN photodiodes, and are used in the "photovoltaic" mode, whereby an electrical current is produced by the photocell, and amplified by an op-amp. The amount of electrical current increases linearly as the intensity of the light over the entire area of the photocell increases linearly. The amount of electrical current also increases linearly as the illuminated portion of the photocell is linearly increased, as long as the illumination across the entire area is constant. That is, if light is illuminating half the light sensor area, and light is blocked from the other half of the light sensor area, the electrical current that is output will be half the amount as of that for a complete illumination of the light sensor, yielding a linear relation of position detector output to photocell area illumination.

Regardless of the type of position detector used, capacitive or optical, all known position detectors are believed to suffer from one common problem. They all output a signal that is indicative of relative shaft rotation, but they do not output a signal that is indicative of absolute shaft rotation. That is to say, it is impossible for the servo controller to read the position signal voltage or current, and know the precise mechanical angle of the shaft, in absolute terms. This is because the output from the photocells or the capacitive plates is proportional to the light produced by the LED or the signal produced by the oscillator, respectively. In the case of the optical position detectors, if the light from the LED increases due to environmental changes, or due to component drift, the output produced by the photocells will increase proportionally. This proportional increase will fool the servo into believing that the shaft has been rotated to a greater mechanical angle. The servo will then try to compensate for this, and generate an error.

All known position detectors attempt to correct for this by using an AGC circuit such as known in the art. In the case of the optical position detectors, the light received by all photocells are added together, to form a "total light" signal voltage. This "total light" voltage is compared to a reference voltage, and an error signal is produced that drives the LED. If the "total light" is sensed to have increased, then the light output by the LED is made to decrease by a corresponding amount, thus trying to maintain the sensitivity of the position detector over time. However, the use of AGC is only good enough to correct first-order problems. All known position detectors suffer from position offset drift (a change in what the position detector believes is the "absolute zero" degree position of the shaft) and position scale drift (a change in what the position detector indicates in terms of volts per degree) due to second-order effects, such as drift of the reference voltage itself, or change of the feedback resistors used in the op-amp circuits. These changes occur with time and temperature.

In the past, attempts have been made to provide additional signals to rotational position detectors that are indicative of certain absolute positions. On an elective or automatic basis, the servo can exercise the galvanometer scanner in search of these additional signals, and thus become aware of the absolute position scale and position offset of the position detector. When implemented in a capacitive position detector, this technique has several parasitic problems. First, capacitive position detectors are very sensitive to the shape of the plate members. Plates with protrusions or notches will have an impacted linearity due to fringe effects that happen as a result of the protrusions or notches. Fringe effects will also impact linearity if additional capacitive plates are used. And whether this technique is used with an optical position detector or with a capacitive position detector, the specially shaped moving butterfly is more expensive to manufacture.

The dominant servo used to control galvanometer-based optical scanners has been the PID servo system made entirely with analog components (analog servos). Analog servo systems have been used because they are relatively inexpensive and relatively simple, and also because up until now, digital servo systems could not achieve the high resolution and high sample rate necessary to be usable with the fastest galvanometer scanners. In order to support the fastest galvanometer scanners currently on the market, and achieve step times in the sub-100-microsecond range, a sample rate of 200 kHz must be used, along with a sampling resolution of 16 bits. And because of the multiple internal calculation steps needed, floating point calculations are highly desirable. Until recently, it was cost-prohibitive to implement a servo controller in a digital form with this high sample rate and resolution. However, with the constant progress that inevitably occurs in technological fields, digital signal processors (DSPs) and A/D converters are now becoming available with sufficient speed and at a reasonable cost, which will help cause a shift from analog servos to DSP-based servos for use with galvanometer scanners.

Analog servos typically have a relatively large number of potentiometers used to "tune" the servo for optimal performance. These potentiometers adjust a number of servo parameters including servo gain, damping, notch filter frequency, notch filter depth, input gain, input offset, etc. There are typically also two additional potentiometers to adjust the position scale and position offset of the position detector. Although these last two are not servo parameters in the strictest sense, they certainly do affect servo performance and accuracy. All these potentiometers must be manually adjusted, or "tuned," by humans. Typically this tuning is done at the factory, but sometimes further tuning is required in the field. Because engineers may not be the end-users of systems with galvanometer scanners, any non-factory tuning can result in sub-optimal operation.

The shift towards DSP-based servo systems will obviate the need for all these adjustment potentiometers, because servo parameters such as servo gain, damping, notch filter frequency, etc. will all be set by algorithmic constants. These algorithmic constants can be manually "tuned" by humans, in a similar way that the potentiometer adjustments were made, only using a user interface to make the adjustments, or alternatively these algorithmic constants may be tuned automatically, by some intelligent tuning algorithm. This is possible because almost all the information about the scanning system can be gleaned merely by exercising the scanner and observing what happens with the position signal. For example, the torque constant of the scanner can be derived by observing the back-EMF of the scanner. Stated in mechanical engineering terms KT=KE. That is, dyne centimeters of torque per amp is directly proportional to motor back-emf volts per degree per second. Thus, if the servo creates scanner motion, and can measure the "degrees per second" and the motor back emf, then the servo can derive the precise torque constant (KT) of the scanner.

Once the KT is known, the servo could next apply a pulse of known current for a short time, and measure the angular acceleration that results, and thus the servo can glean the system inertia (J) of the rotor, mirror, and position detector, since force equals mass times acceleration. Therefore, inertia equals KT divided by acceleration.

Next, the servo could wrap a light loop around the scanner and perform a bode plot, thus revealing all system resonances. With this information, the servo could set all constants for the poles and zeros of notch and bi-quad filters.

Once the torque constant, system inertia, and system resonances are all known, all servo parameters could be easily set in a mater of seconds, with digital precision, achieving the absolute maximum performance from the scanner and servo system. But in order for all this to happen, the servo system needs one fundamental piece of information. The servo must know the "position scale." That is, the servo must first know the volts per degree from the position detector.

As discussed previously, with previously known position detectors, it is impossible for servos to know the position scale with absolute certainty; so it is impossible to make a digital servo that will completely auto-tune. Up until now, scanner manufacturers have side-stepped this problem by putting small memory chips within the scanner. A digital servo could read this memory chip, and this memory chip is pre-programmed at the factory with information including the torque constant, position scale, and position offset, and other information about the scanner. The problem with this approach is that these parameters can change over time. The torque constant of the scanner depends on the magnetism of the rotor (or other scanner components), and this magnetism certainly changes with temperature, and, if the scanner is abused or overheated, can also change with time. Position detector components also change with time due to component drift and also due to temperature and other environmental effects.

Therefore, it would be beneficial to provide a rotary position detector having improved signal-to-noise ratio and also provide absolute position accuracy.

SUMMARY OF THE INVENTION

The current invention is directed to an optical position detector that provides low inertia operation and can be used with small optical scanners. Moreover, the current invention provides improved signal-to-noise ratio and may optionally provide absolute position accuracy.

A rotary position detector is provided herein that comprises a housing having an inner space defined by an inner wall having a reflective surface on at least a portion thereof. A light source is positioned to emit light rays into the housing's inner space from a bottom thereof. A base is positioned within the housing's inner space.

A light detector assembly is positioned within the housing's inner space and comprises a first number of substantially toroidal-sector-shaped light sensors positioned on the base and disposed in pairs about an axis of a motor shaft. Each pair comprises one "A" detector element and one "B" detector element. The pairs are disposed so that each "A" detector is circumferentially positioned between two "B" detectors and each "B" detector is positioned between two "A" detectors. The term "light sensor" herein is intended to connote a region of light-sensitive material having substantially the described shape; a different shape of light sensor material could be provided and "masked" off, for example, to provide the recited light sensors.

A light blocker is affixed within the housing's inner space for rotation with the motor shaft above the light detector assembly and the light source. The light blocker comprises a second number of opaque, substantially equal-surface-area elements arrayed about the motor shaft axis. The second number is equal to one-half of the first number. Thus the light rays emanating from the light source that reach the reflective surface are reflected onto the light detector assembly, and light rays that are blocked by the light blocker from reaching the reflective surface are not received by the light detector assembly.

A signal connection is provided between the light detector elements and a circuit for measuring a signal from the "A" detectors and the "B" detectors relating to an amount of light falling thereon. A difference between the "A" detector signal and the "B" detector signal is related to an angular position of the motor shaft.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 3 is a top/side perspective view of the position sensor of the current invention with the housing removed and the shaft illustrated to be rotating counterclockwise.

FIG. 4 is a top plan view of the position sensor, including the circuit board, light sensors, and light blocker, illustrating a light blocker that is much smaller than the outside diameter of the light sensors.

FIGS. 5A,5B illustrate top/side (FIG. 5A) and bottom (FIG. 5B) perspective views of an alternate embodiment of the light blocker that is cup-shaped.

FIGS. 5C,5D illustrate top/side (FIG. 5C) and bottom (FIG. 5D) perspective views of an alternate embodiment of the light blocker that has a "top-hat"-type shape.

FIG. 5E illustrates a top/side perspective view or another embodiment of a light blocker that has a cutaway top face.

DESCRIPTION OF PREFERRED EMBODIMENTS

The present invention will now be described more fully hereinafter with reference to FIGS. 1-11, in which preferred embodiments of the invention are shown. Unless otherwise defined, all technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. Any publications, patent applications, patents, or other references mentioned herein are incorporated by reference in their entirety. In case of conflict, the present specification, including any definitions, will control. In addition, the materials, methods, and examples given are illustrative in nature only and not intended to be limiting. Accordingly, this invention may be embodied in many different forms and should not be construed as limited to the illustrated embodiments set forth herein. Rather, these illustrated embodiments are provided so that this disclosure will be thorough and complete, and will fully convey the scope of the invention to those skilled in the art. Other features and advantages of the invention will be apparent from the following detailed description.

The optical position detector of the present invention uses the "shadow cast" technique. The individual elements of this position detector are improved when compared with other known optical position detectors, yielding improved results from the standpoint of position accuracy and also from the standpoint of signal-to-noise ratio. Moreover, some embodiments of this position detector allow for absolute position determination based on an ability for the position detector to indicate when it has reached certain angular conditions.

Figure 1:
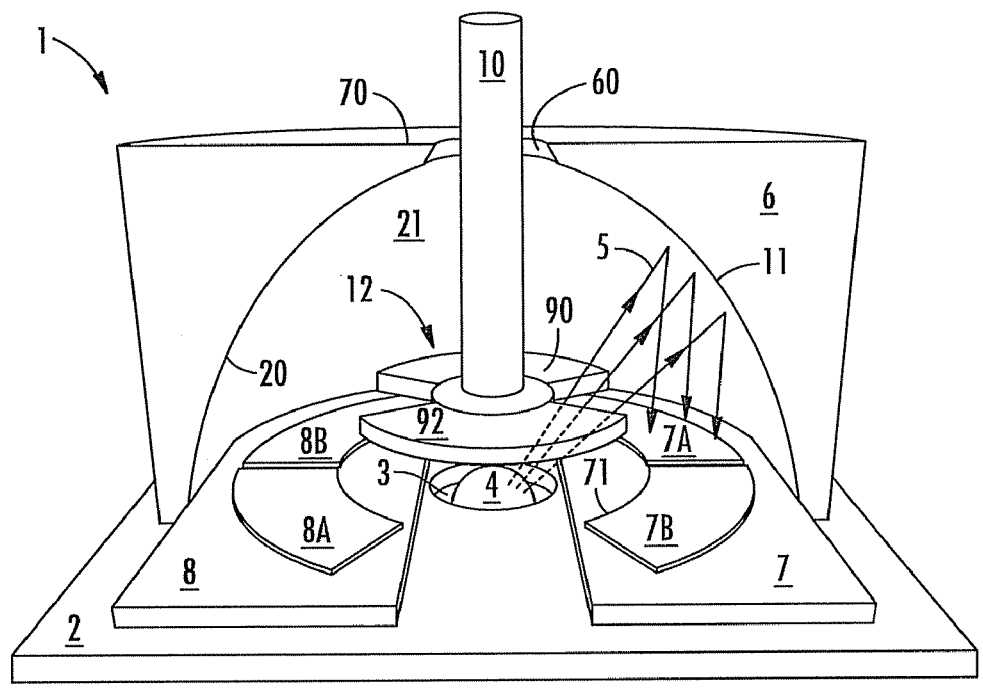
FIG. 1 is a side perspective view of an embodiment of the optical position detector of the current invention, with the housing illustrated in cut-away view.

A preferred embodiment of this invention can be seen in FIG. 1, and is described in the context of its use within a motor or galvanometer scanner, although this is not intended as a limitation. In the position detector 1 of FIG. 1, a light source 4 is positioned within an inner space 21 of a housing 6. The housing 6 is adapted to house the position sensor system components and to absorb unwanted light rays from the environment, and also to connect the components to the shaft 10 of a motor in a particular embodiment. The housing 6 can comprise, for example, injection-molded plastic or machined metal, although this is not intended as a limitation.

The light source 4 preferably produces a substantially circumferentially uniform field of light, directing light rays 5 toward the inner wall 20 of the housing 6. The inner wall 20 of the housing 6 includes a specular reflective surface 11, which redirects the light rays 5 toward a plurality of light sensors 7A,7B,8A,8B, which can comprise, for example, toroidal-sector-shaped elements. The light sensors 7A,7B,8A,8B can be manufactured on light detector chips 7,8 and mounted on a base comprising a circuit board 2, and on the same side of the motor as the light source 4.

A light blocker 12 having a plurality of substantially pie-shaped protrusions 90 and 92, periodically interrupts the light rays 5 from reaching the inner surface of the housing 6, and consequently, also periodically interrupts the light rays from reaching certain areas of the light sensors 7A,7B,8A,8B, by casting a shadow thereover.

The light blocker 12 in this configuration is operably connected to a motor shaft 10 that extends through an aperture 60 in a top portion 70 of the housing 6. The rotation of motor shaft 10, driven by a motor, causes the light blocker 12 to rotate. As the illumination areas of some light sensors 7A,8A, 7B,8B increase (when less of the light sensor area is under a shadow), an output signal from the light sensors 7A,8A,7B, 8B also increases. Simultaneously and by the same amount, as the illuminated areas of other light sensors 7A,8A,7B,8B decrease (when more of the light sensor area is under a shadow), the output signal from these light sensors 7A,8A, 7B,8B decrease.

Figure 2:
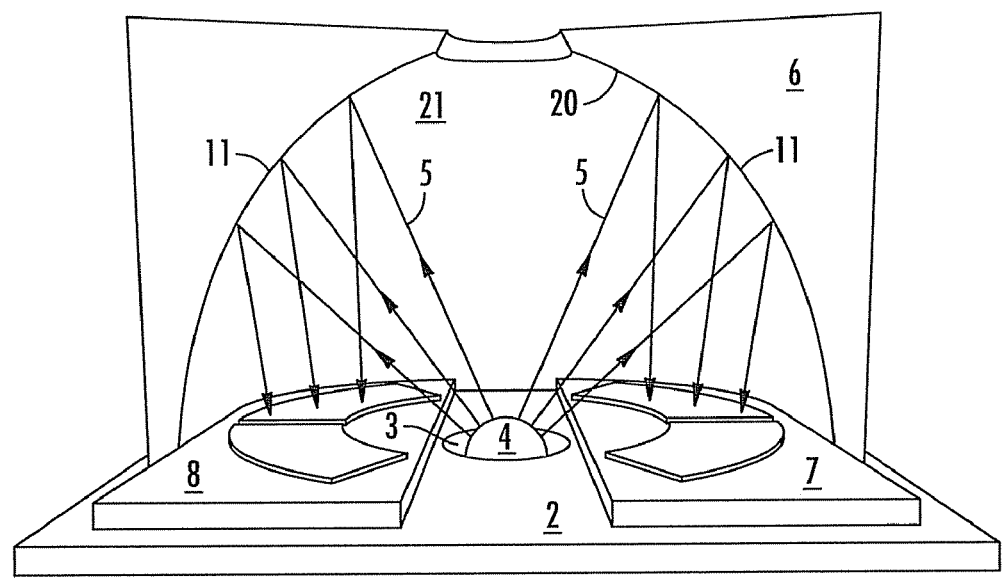
FIG. 2 is a side perspective view of the optical position detector of FIG. 1, illustrating the light path of the light rays when a light blocker is not present, with the housing illustrated again in cut-away view.

The position sensor light source and inner housing will now be described, with reference to FIGS. 1 and 2. The light source 4 preferably comprises a unitary LED, mounted on the same circuit board 2 with the light detector chips 7 and 8. FIGS. 1 and 2 show the LED mounted on the opposite side of the circuit board as the light detector chips 7 and 8, and the light from the light source 4 is directed through hole 3 in circuit board 2. This is desirable because any light that is emanating in a sideways fashion will be terminated on the circuit board 2 material and will not be able to shine directly on the light detector chips 7 and 8. However, other embodiments are also possible as long as the light source is suitable and substantially centrally located. For example, a single LED chip could be mounted on the same side of the circuit board as light detectors 7 and 8, or even mounted directly on the light detector dies.

The light rays 5 are projected from the light source 4 in the direction away from the light detector chips 7 and 8 and toward the inner wall 20 of the housing 6. The inner wall 20 of the housing 6 includes a specular reflective surface 11, which reflects the light rays 5 back toward the light detector chips 7 and 8.

The specular reflective surface 11 may be curved as shown, for example, in a parabolic or ellipsoidal shape, thereby making the light rays more parallel, and concentrating the light rays in the general area of the light detectors 7A,7B,8A,8B. However, the specular reflective surface 11 may also be embodied in other shapes, for example, conical or even as a flat ring 61, as long as the light rays 5 from the light source 4 that are not blocked by the light blocker 12 are allowed to reach the light detectors 7A,7B,8A,8B.

Also, FIGS. 1 and 2 show the inner wall 20 of the housing 6 having the specular reflective surface 11, but it is conceivable that an embodiment could exist whereby the specular reflective surface 11 is provided by a separate component that is held in place by the housing 6.

Although the position detector light source 4 has been described as an LED, the light source may also be embodied as a phosphorescent dot, or any other source that produces a suitable cone of light in the direction needed. Note that the position detector light source may be fiber-fed. That is, the actual light source may be located remotely, for example, on the servo driver board, and fed to the galvanometer scanner with an optical fiber. This might be done in military applications where the scanner would have to work at higher temperatures, which would be prohibitive for direct LED operation. Also, when fed by a fiber, a laser can be used as the light generating means for the light source.

Embodiments of the light detector assembly and light blocker will now be discussed, the positioning of which can be as illustrated in FIG. 1, for example, with reference to FIGS. 3 and 4. The light detector assembly is positioned within the inner space 21 of the housing 6. In the exemplary detector assembly of FIGS. 3 and 4, the light sensors comprise a first number, here, four, substantially toroidal-sector-shaped, substantially equal-surface-area light sensors 7A,7B, 8A,8B that are arranged in pairs on light detector chips 7,8 about the light source 4, and mounted to a circuit board 2. Each pair comprises one "A" detector element 7A,8A, and one "B" detector element 7B,8B. The pairs are disposed so that each "A" detector 7A,8A is circumferentially positioned between two "B" detectors 7B,8B and each "B" detector 7B,8B is positioned between two "A" detectors 7A,8A.

The sensor configuration essentially dictates a configuration of the light blocker 12 and its blades 90,92. The light blocker 12 comprises a second number, here, two, of opaque, substantially equal-surface-area elements 90,92, arrayed about the motor shaft axis 10. Note that the second number (e.g., two) is equal to one-half of the first number (e.g., four).

Figure 8:
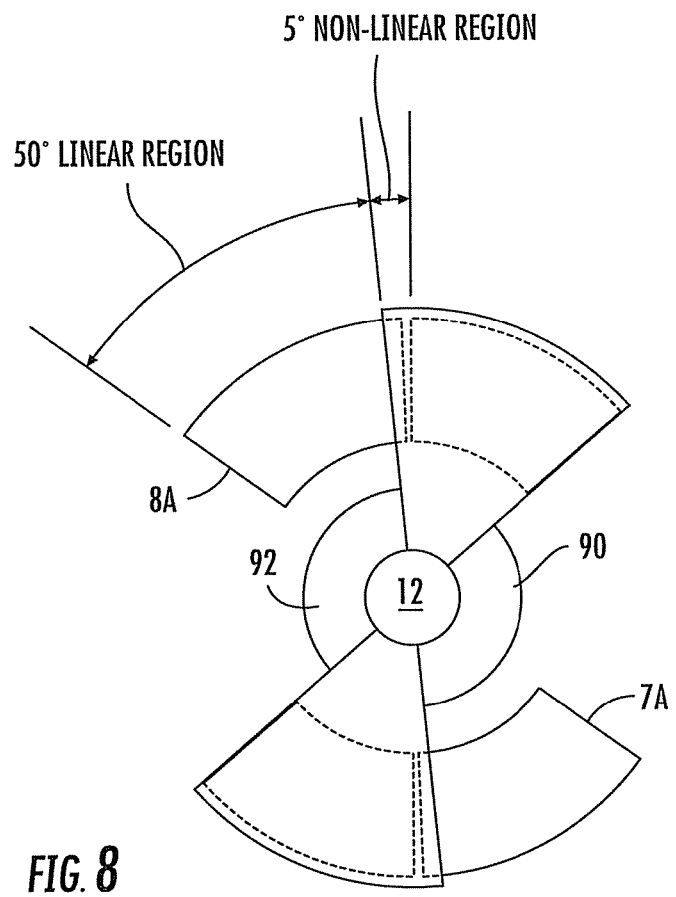
FIG. 8 illustrates in top plan view a relationship between light blocker elements and light sensors. Dashed lines show where the individual light sensor elements are with respect to the light blocker.
Figure 9:
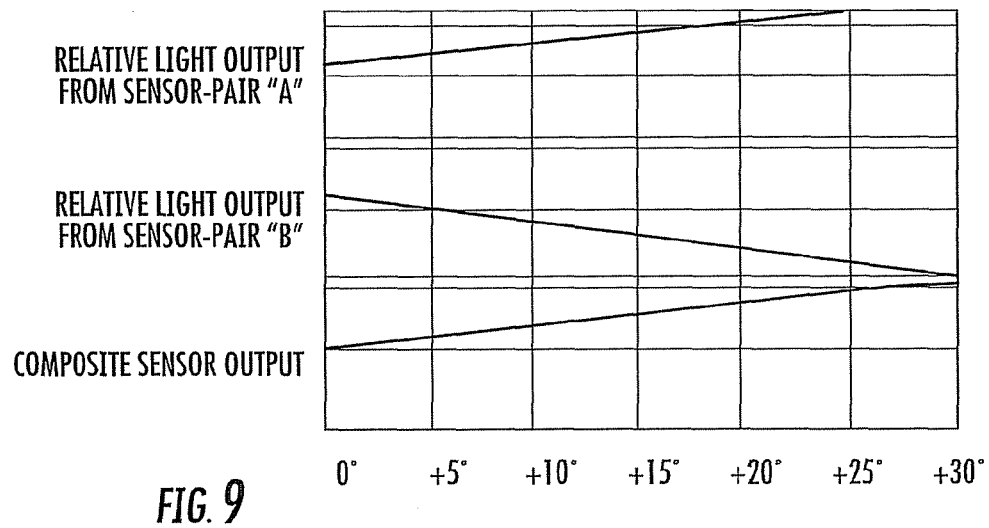
FIG. 9 is a plot of the output signal from the "A" and "B" pairs of light sensors, along with the composite "A minus B" output, wherein it is illustrated that the composite output is linear until either the "A" pair or "B" pair of light sensors is entirely uncovered; after that, the position detector still provides output, but at a reduced rate of change.
Figure 10:
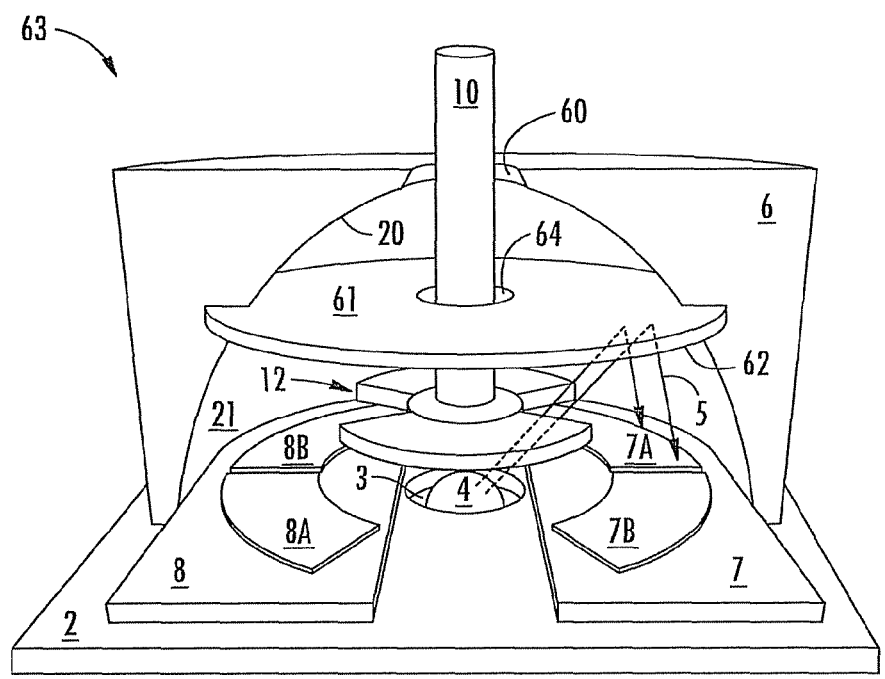
FIG. 10 is a side perspective view of another embodiment of the optical position detector of the current invention having a reflector positioned within the housing, which is illustrated in cut-away view.
Figure 11:
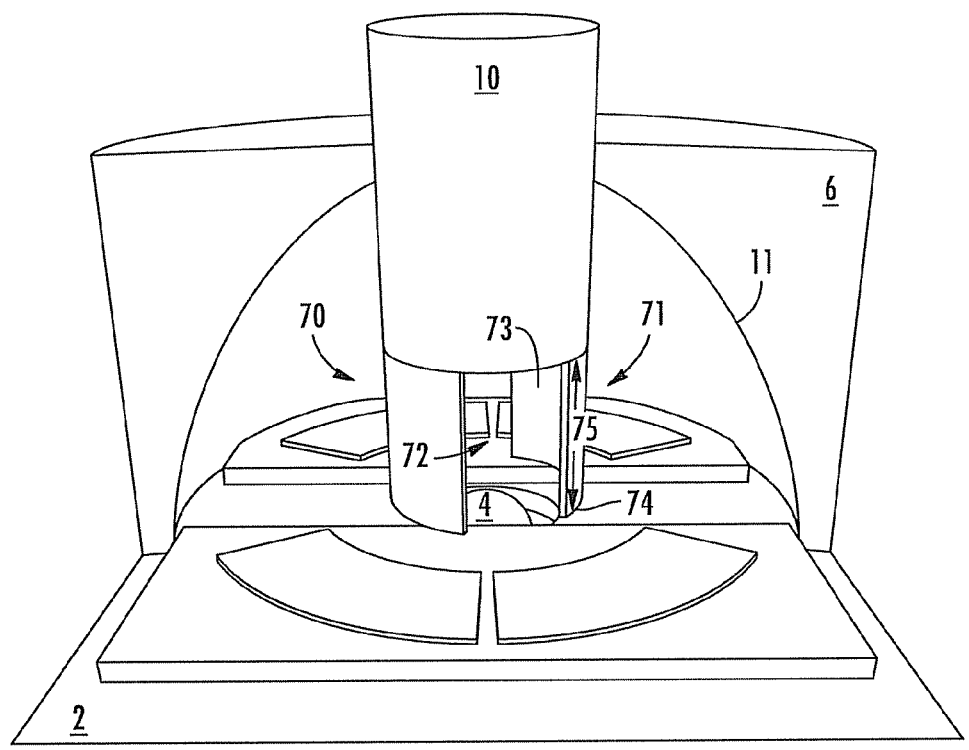
FIG. 11 is a side perspective view of another embodiment of the optical position detector of the current invention wherein the light blocker is formed by a bottom end of the motor shaft, with the housing illustrated in cut-away view.

Referring to FIG. 8, wherein the light blocker is entirely uncovering the "B" pair of light sensor elements, but not entirely covering the "A" pair, an angular subtense of each of the open areas of the light blocker (here, 60 degrees) may be greater than an angular subtense (here, 55 degrees) of a detector element 7A,7B,8A,8B by a different angular subtense (here, 5 degrees). Because of this, further incremental clockwise rotation does not provide any incremental increase in signal output from the "B" pair of light sensors, but does provide an incremental decrease in signal output from the "A" pair. When the angular subtense the light blocker openings is greater than that of the light detector elements 7A,7B,8A,8B, the sensor gives a linear output for an angular change up to the angular subtense of the light detector elements 7A,7B,8A,8B, and then provide a nonlinear output for an angular change beyond that point.

The radial extent of each of the light blocker elements 90,92 may be less than the radial extent of the light detector elements 7A,7B,8A,8B, and may be no greater than the radial extent of an inner edge 71 of the light detector elements 7A,7B,8A,8B. In some cases the radial extent of the light blocker elements 90,92 may be significantly less, depending upon factors including the cone angle of the light source 4 and the extent of the reflective portion 11 of the inner wall 20. This is advantageous when compared to prior art sensors whose light blocker radial extent had to be greater than the radial extent of the outer diameter of the light detectors 7A,7B,8A,8B. A smaller radial extent reduces inertia substantially, and thus, also increases system performance.

The light blocker 12 can be configured such that when the shaft 10 is rotated in a "positive" direction 85 (moving from the configuration shown in FIG. 1 to that shown in FIG. 3), most of the "A" light sensor elements' area is illuminated by the light source 4, and most of the "B" light sensor elements' area will be under a shadow. Thus, as the light blocker 12 is rotated, once it fully uncovers the "A" light sensors 7A,8A, it can actually be rotated further before it fully blocks light from reaching the "B" light sensors 7B,8B. This allows the servo to detect precisely when the "A" or "B" sensors are fully covered and thus detect precisely the outer angles of the position sensor in absolute terms. However, some applications may not require this absolute position determination, and can use a light blocker whose openings have the same angular subtense as the sensor elements 7A,7B,8A,8B.

Although the figures show four light detectors 7A,7B,8A,8B and a light blocker with two protruding elements 90,92, it should be understood that as few as four light detectors and two light blocker protrusions, or as many as eight light detectors and four light blocker protrusions, or more, are possible, and still fall within the scope of this invention.

The individual light sensor elements can comprise a light sensor material or device that operates on the principle whereby a linear increase in light per unit area produces a linear increase in output signal. As a non-limiting example, silicon photodiodes, PIN photodiodes, avalanche photodiodes, and cadmium sulfide cells may be used as the light sensor elements in this invention. These are generically referred to as "photocells."

It is known to arrange individual pairs of light sensors on a single "photocell" die that is rectangular, as shown in FIGS. 1-4. However, the individual light sensors may be assembled in any way, as long as the linearity and shape constraints outlined above are met. Further, the light sensors may have a greater area than shown, for example, may each comprise a chip of any shape, with a masking element placed thereover to create the sector shape desired to be used.

The light blocker is designed to prevent light rays emanating from the light source 4 from reaching portions of the specular reflective coating 11 on the housing's inner wall 20, and thus, to prevent light rays from reaching portions of the light sensors 7A,7B,8A,8B. The light blocker 12 comprising pie-shaped blades 90,92 can be operatively connected to a rotating shaft 10 with epoxy or other attachment means.

Since the light blocker only needs to prevent light from reaching the light sensors, it can be made out of a variety of materials. For example, it can be made from ceramic, fiberglass/epoxy, sheet metal, glass, plastic, or any other suitable material that can block light. The light blocker can be made using conventional manufacturing techniques such as injection molding, laser cutting, stamping, photo-etching, or standard machining techniques.

The light blocker may be made to conform the shape shown in FIGS. 1-4, or it may be made from a transparent disk whereby the blocking function is performed by an opaque material being deposited onto the transparent disk. In addition, other embodiments are also possible. FIGS. 5A,5B show an alternate embodiment of a light blocker 30 in which a cup-shaped light blocker is formed with axial protrusions. That is, a top face 31 of the light blocker 30 has two substantially pie-shaped elements 32 arrayed about a central disk 33. Downwardly depending from the top face 31 are side walls 34 forming a partial cylinder having a top edge 35 coextensive with an outer edge 36 of the top face 31.

FIGS. 5C,5D show yet another embodiment of a light blocker 40 having an inner portion having a similar shape to the light blocker 30 described above. Here, however, two bottom elements 41 extend outwardly from the side walls 42, forming a pair of toroidal-sector-shaped flanges, the inner edges 43 of which join the side walls 42 at bottom edges 44 thereof. This light blocker 40 thus has a kind of "top-hat" shape.

FIG. 5E illustrates a further embodiment of a light blocker 50 that comprises a substantially cylindrical element having an interior space 57 defined by a side wall 54 and positioned to receive the light rays from the light source 4. The cylindrical element in a particular embodiment has a pair of opposed, substantially equal-area openings 52 through a top face 51 thereof and diametrically opposed about a central disk 53. The openings 52 are for admitting light rays therethrough for reaching the reflective surface 11.

In yet a further embodiment (FIG. 11), the light blocker 70 comprises a bottom portion 71 of the motor shaft 10. The bottom portion comprises a generally cylindrical portion having an interior space 72 that is positioned to receive the light rays from the light source 4. The cylindrical portion 71 has two opposed, equal-sized openings 73, or "windows," extending therethrough, for example, in this embodiment, from a bottom edge 74 thereof, although this is not intended as a limitation. The openings 73 define sections of the cylindrical portion 71 that can serve as the light blocker elements. Again, the word "pair" is not intended as a limitation, and the number may comprise up to 8, or even more, in some applications. Each opening 73 has a height 75 sufficient to admit light rays therethrough for reaching the reflective surface 11.

It is believed that the light blockers 30,40,50,70 described above can improve the shadow that is cast on the light detectors, particularly if the light source is not a point source and/or if the quality of the specular reflective surface is marginal or poor.

Note that it is not strictly necessary for the alternative light blocker embodiments to have rectangular features. The cup may be made with cone-like features, which may provide easier manufacturing of the light blocker or better light blockage. Moreover, the light blocker itself may be embodied as blades or even splines that are machined directly onto a motor shaft itself to perform the light blocking function.

Unlike previously known rotary position sensors, the openings of the light blocker may have a larger angular subtense than the individual light sensor elements. When this is done, there are several advantages. One advantage is that, since the angular subtense of the light blocker openings is larger than the angular subtense of the light sensors, when rotated in a "positive" direction 85, the "A" light sensors become fully unblocked before the "B" light sensors are fully blocked. Further "positive" rotation still produces a detectable output from the "B" sensors, but does not produce an output from the "A" sensors. Thus this condition of further change from one output with no further change from the other may be used to precisely determine the shaft angle in absolute terms. Another advantage is that if the A and B outputs are subtracted, as is the typical method for this type of sensor, there is a "linear" portion of shaft rotation angle to output signal correspondence, and, at the edges, there is a "nonlinear" portion of shaft angle to output signal correspondence. For example, in FIG. 9, the rate of change of output is shown to change above 25 degrees.

Preferably, in general, light blocker openings have an angular subtense at least as great as than the light sensors' angular subtense. However, one of skill in the art will appreciate that the angular subtense could be substantially the same as, or even less than, that of the light sensors without departing from the spirit of the invention. In some embodiments, the angular subtense of light blocker openings can be made larger than that of the light sensor elements by any desirable amount that satisfies the engineering needs of the system. However, for optical scanning applications, it can typically reside in a range of 2-10 degrees.

The number of light blocker openings can comprise as few as 2, and as many as 8 or more, as long as there are two light sensors ("A" and "B") per light blocker opening, with a greater number of light blocker openings reducing the angle of operation of the position detector. The maximum angle (in degrees) over which this position detector can output a single ramp signal from the "main" outputs is equivalent to 360 divided by the number of blades minus the (blade angle of subtense minus the light sensor angle of subtense).

When the light blocker made of a material that substantially completely absorbs light, light is not permitted to pass through to the specular reflective surface, and thus to the detectors. For this example, the light blocker can comprise black plastic, black-anodized metal, or a black coating deposited on a transparent disk or transparent tube. In this way, all light that is emitted from the light source is either reflected off of the specular reflective coating and then strikes the light detectors or is absorbed by portions of the light blocker.

It should be noted also that, although the light blockers described herein have protrusions, one of skill in the art will recognize that they may have no protrusions, but light-blocking areas. For example, the light blocker can comprise a transparent disk, or other light guide, with blocking areas imprinted thereon.

In an alternative embodiment 63 (FIG. 10), the reflective surface can comprise at least a portion of a bottom face 62 of a toroidal reflective element 61 positioned within the housing's inner space 21, an aperture 64 therethrough sufficient for permitting the motor shaft 10 to rotate therewithin. In this embodiment 63, the reflective element 61 is affixed to the housing's inner wall 20 above the light blocker 12. As for the embodiment 1 of FIG. 1, light rays 5 that are not blocked by the light blocker 12 reach the reflective bottom face 62 of the reflective element 61 and are reflected onto the light sensors 7A,7B,8A,8B.

Figure 6:
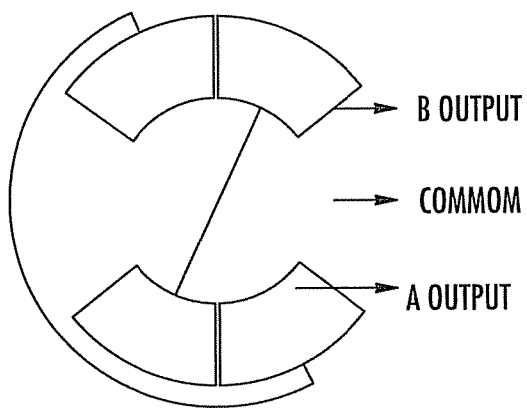
FIG. 6 illustrates an embodiment of light sensor element connectivity to provide output signals, wherein diametrically opposed light sensor elements are connected, and only two outputs are provided.

The signals generated by the rotary position detector of the present invention will now be discussed. In one embodiment, individual light sensor elements are connected in parallel, so that a minimum of wires are sent to the servo controller, as shown in FIG. 6. A benefit of this connection scheme is that it reduces the number of wires that are needed to be connected from the position detector to the servo system. However, a common drawback with prior art position sensors is that, if the individual light sensor elements that are connected in parallel do not produce exactly the same amount of output signal as other individual light sensor elements for a given amount of light, then insensitivity to radial and axial motion is not optimal.

Figure 7:
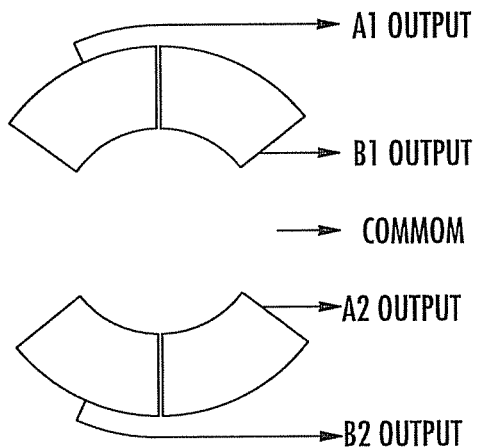
FIG. 7 illustrates another embodiment of light sensor element connectivity to provide output signals, wherein the output of each light sensor element is used directly with no connection made to other light sensor elements.

As an alternative connection scheme, the output from individual light sensor elements can be used individually, as shown in FIG. 7. An advantage of this arrangement is that the servo can characterize the output from each light sensor and then algorithmically increase linearity and radial insensitivity. In these embodiments, the connections to the outputs are made via the pads 9 on the circuit board 2.

The position detector of the present invention is particularly useful when connected to a digital servo system, which can exercise the scanner and easily locate the point in the shaft rotation at which the "A" and "B" light sensors are completely blocked, and thus determine the extent of angular excursion in absolute terms. Because of this, an AGC system may not be needed, and the light source can be operated at maximum output all the time, thus maximizing signal-to-noise ratio.

In the drawings and specification, there have been disclosed typical preferred embodiments of the invention, and although specific terms may have been employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

What is claimed is:

1. A rotary position detector comprising:
   a housing having an inner space defined by an inner wall and having an aperture in a top portion thereof for admitting a motor shaft therethrough;
   a base positioned within the housing inner space;
   a light source positioned to emit light rays upwardly into the housing inner space from adjacent a bottom thereof;
   a light detector assembly positioned within the housing inner space and comprising a first number of substantially toroidal-sector-shaped light sensors positioned on the base and disposed in pairs about an axis of the motor shaft and about the light source, each pair comprising one "A" detector element and one "B" detector element, the pairs disposed so that each "A" detector is circumferentially positioned between two "B" detectors and each "B" detector is positioned between two "A" detectors;
   a light blocker within the housing inner space rotatable with the motor shaft above the light detector assembly and the light source, the light blocker comprising a second number of opaque, substantially equal-surface-area elements arrayed about the motor shaft axis, the second number equal to one-half of the first number, wherein a radial extent of the light blocker elements is substantially less than a radial extent of the light sensors;
   a reflective surface within the housing inner space above the light blocker, wherein light rays emanating from the light source that reach the reflective surface are reflected downward, so that some of the light rays reach the light detector assembly, and light rays that are blocked by the light blocker from reaching the reflective surface are not received by the light detector assembly; and
   a signal connection between the light detector elements and a circuit for measuring a signal from the "A" detectors and the "B" detectors relating to an amount of light impinging thereon, a difference between the "A" detector signal and the "B" detector signal related to an angular position of the motor shaft.

2. The rotary position detector recited in claim 1, wherein the light blocker elements radial extent is no greater than a radial extent of an inner edge of the light sensors.

3. The rotary position detector recited in claim 1, wherein the light blocker has a plurality of openings, each opening between adjacent light blocker elements, and wherein the angular subtense of each of the light blocker openings is at least as great as the angular subtense of the light sensors.

4. The rotary position detector recited in claim 1, wherein the light source comprises a unitary light source generally aligned with the motor shaft axis.

5. The rotary position detector recited in claim 1, wherein the first number comprises four light sensors.

6. The rotary position detector recited in claim 1, wherein the light sensors comprise a light sensor material responsive to light wherein a linear increase in light per unit area impinging thereon causes a substantially linear increase in output signal.

7. The rotary position detector recited in claim 1, wherein the light blocker elements comprise blades.

8. The rotary position detector recited in claim 1, wherein the light blocker comprises a substantially transparent disk having imposed thereon the opaque elements.

9. The rotary position detector recited in claim 1, wherein the reflective surface comprises a portion of the housing inner wall.

10. The rotary position detector recited in claim 1, wherein the reflective surface comprises an element positioned within the housing inner space, the element having a bottom face at least a portion of which is reflective, and further having an aperture sufficient to admit the motor shaft therethrough.

11. The rotary position detector recited in claim 1, wherein each of the light blocker elements further comprises a side wall depending downward therefrom to form a light blocker that is substantially cup-shaped.

12. The rotary position detector recited in claim 11, wherein each of the light blocker elements further comprises a toroidal-sector-shaped flange extending outwardly from a bottom edge of the side wall.

13. The rotary position detector recited in claim 1, wherein the light blocker comprises a substantially cylindrical element having an interior space defined by a side wall and positioned to receive the light rays from the light source, the cylindrical element having a pair of spaced-apart, substantially equal-area openings through a top face thereof for admitting light rays therethrough for reaching the reflective surface.

14. The rotary position detector recited in claim 13, wherein the openings have an angular subtense at least as great as the light sensor angular subtense.

15. The rotary position detector recited in claim 1, wherein the light blocker comprises a bottom portion of the motor shaft, the bottom portion comprising a generally cylindrical portion having an interior space positioned to receive the light rays from the light source, the light blocker elements comprising segments of the cylindrical portion separated by spaced-apart openings extending from a bottom edge thereof having a height sufficient to admit light rays therethrough for reaching the reflective surface.

16. The rotary position detector recited in claim 15, wherein the openings have an angular subtense at least as great as the light sensor angular subtense.

17. A method of detecting a rotary position of a motor shaft comprising:
    shining light upwardly into an inner space of a housing having an aperture in a top portion thereof for admitting a motor shaft therethrough;
    reflecting at least some of the light downward;
    detecting at least some of the reflected light with a light detector assembly positioned within the housing inner space and comprising a first number of substantially toroidal-sector-shaped light sensors positioned on the base and disposed in pairs about an axis of the motor shaft, each pair comprising one "A" detector element and one "B" detector element, the pairs disposed so that each "A" detector is circumferentially positioned between two "B" detectors and each "B" detector is positioned between two "A" detectors;
    blocking a portion of the upwardly shining light with a light blocker within the housing inner space rotatable with the motor shaft, the light blocker comprising a second number of opaque, substantially equal-surface-area elements arrayed about the motor shaft axis, the second number equal to one-half of the first number, the blocked light portion thereby unable to reach the light sensors, wherein a radial extent of the elements is substantially less than a radial extent of the light sensors; and
    receiving and processing a signal from the "A" detectors and the "B" detectors relating to an amount of light impinging thereon, a difference between the "A" detector signal and the "B" detector signal related to an angular position of the motor shaft.

18. The method recited in claim 17, wherein the light blocker elements radial extent is no greater than a radial extent of an inner edge of the light sensors.

19. The method recited in claim 17, wherein the shining step comprises shining light from a unitary light source generally aligned with the motor shaft axis.

20. The method recited in claim 17, wherein the first number comprises four light sensors.

21. The method recited in claim 17, wherein the light sensors comprise a light sensor material responsive to light wherein a linear increase in light per unit area impinging thereon causes a substantially linear increase in output signal.

22. The method recited in claim 17, wherein the light blocker elements comprise blades.

23. The method recited in claim 17, wherein the light blocker comprises a substantially transparent disk having imposed thereon the opaque elements.

24. The method recited in claim 17, wherein the reflecting step comprises reflecting the at least some of the light from a reflective portion of the housing inner wall.

25. The method recited in claim 17, wherein the reflecting step comprises reflecting the at least some of the light from an element positioned within the housing inner space, the element having a bottom face, at least a portion of which is reflective, and further having an aperture sufficient to admit the motor shaft therethrough.

26. A rotary position detector comprising:
    a motor shaft:
    a housing having an inner space defined by an inner wall and having an aperture in a top portion thereof receiving the motor shaft therethrough;
    a base positioned within the housing inner space;
    a light source positioned at the base to emit light rays into the housing inner space from adjacent a bottom thereof toward the motor shaft;
    a light detector assembly positioned within the housing inner space and comprising a first number of substantially toroidal-sector-shaped light sensors positioned on the base and disposed in pairs about an axis of the motor shaft and about the light source, each pair comprising one "A" detector element and one "B" detector element, the pairs disposed so that each "A" detector is circumferentially positioned between two "B" detectors and each "B" detector is positioned between two "A" detectors;
    a light blocker within the housing inner space rotatable with the motor shaft above the light detector assembly and the light source, the light blocker comprising a second number of opaque, substantially equal-surface-area elements arrayed about the motor shaft axis, the second number equal to one-half of the first number wherein the light blocker elements radial extent is no greater than a radial extent of an inner edge of the light sensors;

a reflective surface within the housing inner space above the light blocker, wherein the reflective surface extends substantially around the motor shaft, and wherein the light rays emanating from the light source that reach the reflective surface are reflected, so that some of the reflected light rays reach the light detector assembly, and those reflected light rays that are blocked by the light blocker from reaching the reflective surface are not received by the light detector assembly; and a signal connection between the light detector elements and a circuit for measuring a signal from the "A" detectors and the "B" detectors relating to an amount of light impinging thereon, wherein a difference between the "A" detector signal and the "B" detector signal is related to an angular position of the motor shaft.

27. The rotary position detector recited in claim 26, wherein the light source comprises a unitary light source generally aligned with the motor shaft axis.

* * * * *